Figure 1:
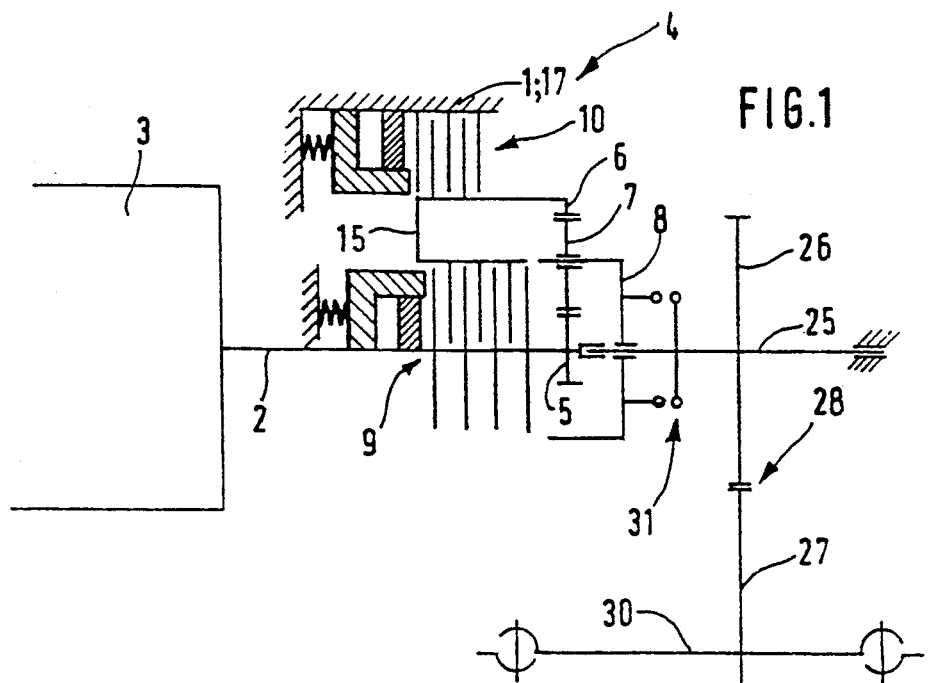

United States Patent [19]

Mann et al.

[11] Patent Number: 5,151,068

[45] Date of Patent: Sep. 29, 1992

[54] DRIVING MECHANISM WITH TWO SPEED CLUTCH

[75] Inventors: Egon Mann; Helmut Eymüller; Siegfried Stützle, all of Friedrichshafen, Fed. Rep. of Germany

[73] Assignee: Zahnradfabrik Friedrichshafen AG, Fed. Rep. of Germany

[21] Appl. No.: 573,045

[22] PCT Filed: Mar. 8, 1989

[86] PCT No.: PCT/EP89/00240

§ 371 Date: Aug. 31, 1990

§ 102(e) Date: Aug. 31, 1990

[87] PCT Pub. No.: WO89/08796

PCT Pub. Date: Sep. 21, 1989

[30] Foreign Application Priority Data

Mar. 11, 1988 [DE] Fed. Rep. of Germany ....... 3808067

[51] Int. Cl.[5] ............................................. F16H 3/44
[52] U.S. Cl. .................................. 475/322; 475/141; 192/87.11; 192/87.14
[58] Field of Search .............. 475/140, 141, 322; 192/87.11, 87.14, 87.15, 85 R

[56] References Cited

U.S. PATENT DOCUMENTS

| | | | |
|---|---|---|---|
| 3,069,929 | 12/1962 | Hansen | 475/322 |
| 4,026,167 | 5/1977 | Archer | 475/141 |
| 4,128,023 | 12/1978 | Kinder | 475/141 |
| 4,178,814 | 12/1979 | Ahlen | 475/142 |
| 4,516,444 | 5/1985 | Herr, Jr. | 475/141 |
| 4,732,253 | 3/1988 | Hiramatsu et al. | 192/87.11 |
| 4,741,422 | 5/1988 | Fuehrer et al. | 192/87.11 |
| 4,955,852 | 9/1990 | Morisawa | 475/140 X |
| 4,971,185 | 11/1990 | Hayakawa et al. | 192/85 R |
| 5,024,636 | 6/1991 | Phebus et al. | 475/141 |

FOREIGN PATENT DOCUMENTS 488062 12/1929 Fed. Rep. of Germany.
2754967 6/1978 Fed. Rep. of Germany.

OTHER PUBLICATIONS

Froslie et al., "Ratio Change-Friction Elements", Design Practices-Passenger Car Automatic Transmission vol. 5, 1988, (SAE, Warrendale PA) pp. 116-124 TL 263.D17.

Primary Examiner—Leslie A. Braun
Assistant Examiner—Benjamin Levi
Attorney, Agent, or Firm—Davis, Bujold & Streck

[57] ABSTRACT

A driving mechanism, specially for mobile excavators and similar construction machines, having a power-shiftable two-gear transmission (4) constructed as planetary gear and driven by a hydromotor, includes two speed levels alternatively engageable and disengageable via hydraulically shiftable friction clutches (9, 10). Both friction clutches (9, 10) are designed as spring accumulator clutches controllable by oil pressure. Both friction clutches (9, 10) are radially telescoped and are to be used both for shifting the gears and as parking brake and auxiliary service brake.

3 Claims, 2 Drawing Sheets

DRIVING MECHANISM WITH TWO SPEED CLUTCH

The invention concerns a driving mechanism, especially for mobile excavators and similar construction machines, which has a power-shiftable two-gear transmission driven by a prime mover, two speed levels alternatively engageable and disengageable via hydraulically shiftable friction clutches, and an oil pump for supplying pressurized and lubricating oil to the transmission, one of said friction clutches being designed as spring accumulator clutch controllable by oil pressure For construction machines such as mobile excavators and wheel bearings which can travel quicker than 25 km/h, the legislator has established different requirements and directive relative to the brakes. In a single-circuit braking system, there must be an auxiliary service brake together with the normal service brake A parking brake is likewise required EP-B1-0 070 420 has disclosed a driving mechanism for a mobile excavator which includes the above features. In said publication a parking brake designed as shoe brake is situated on an output shaft. Such a brake is actuated by oil pressure. This requires a brake control line which in a wheel excavator, for instance, must be conveyed from the upper chassis to the lower chassis through the rotary guiding duct. In any case, such a parking brake requires a certain installation space which is limited, especially in the case of wheel loaders and also in mobile excavators.

The problem to be solved by the invention is to adapt a driving mechanism of the kind mentioned above to the limited installation space in mobile excavators and similar construction machines and to obtain a simplification of the brakes and of the direction of the hydraulic pipes.

In the driving mechanism said problem is solved by the fact that both friction clutches are designed as spring accumulator clutches controllable by oil pressure which are radially telescoped, serving both for shifting the gears and as a parking brake and an auxiliary service brake. The radially external friction clutch is designed as a brake. At the same time the driving mechanism is compacted by telescoping the friction clutches. A parking brake and a separate line for actuating such brake can be eliminated.

If for the first gear, which can also be called the cross-country gear, the radially external larger friction clutch is engaged, then said clutch must be capable of absorbing a multiple of the input torque. But since in the second gear, shifted by the engaged internal friction clutch, the radially external larger friction clutch is disengaged, then at the higher speeds occurring in the second gear, the external clutch can absorb a great braking energy when braking. The heat appearing during braking can be dissipated via the housing. The internal, smaller friction clutch must transmit in second gear only part of the input torque so that said clutch can be designed smaller. When braking in first gear at lower traveling speed, the radially internal clutch must absorb only a small braking energy. The slight heat that generates then is eliminated by appropriate lubrication. Therefore, the internal smaller friction clutch and the external large one are adapted, with the smallest dimensions, to the torque to be transmitted at any given time.

By disposing a separating clutch between the two-gear transmission and the spur gear set, it is possible to interrupt the transmission line when the vehicle is towed in case of emergencies or for relocation. By virtue of the separating clutch, the drive of the transmission line is limited starting on the load side to the range of the spur gear set. The planetary-gear set of the two-gear transmission, the friction clutches and the prime mover are not rotated along.

The invention is not limited to the combination of features of the claims Other logical possible combinations of claims and individual features thereof result for the expert according to the problem to be solved.

Figure 2:
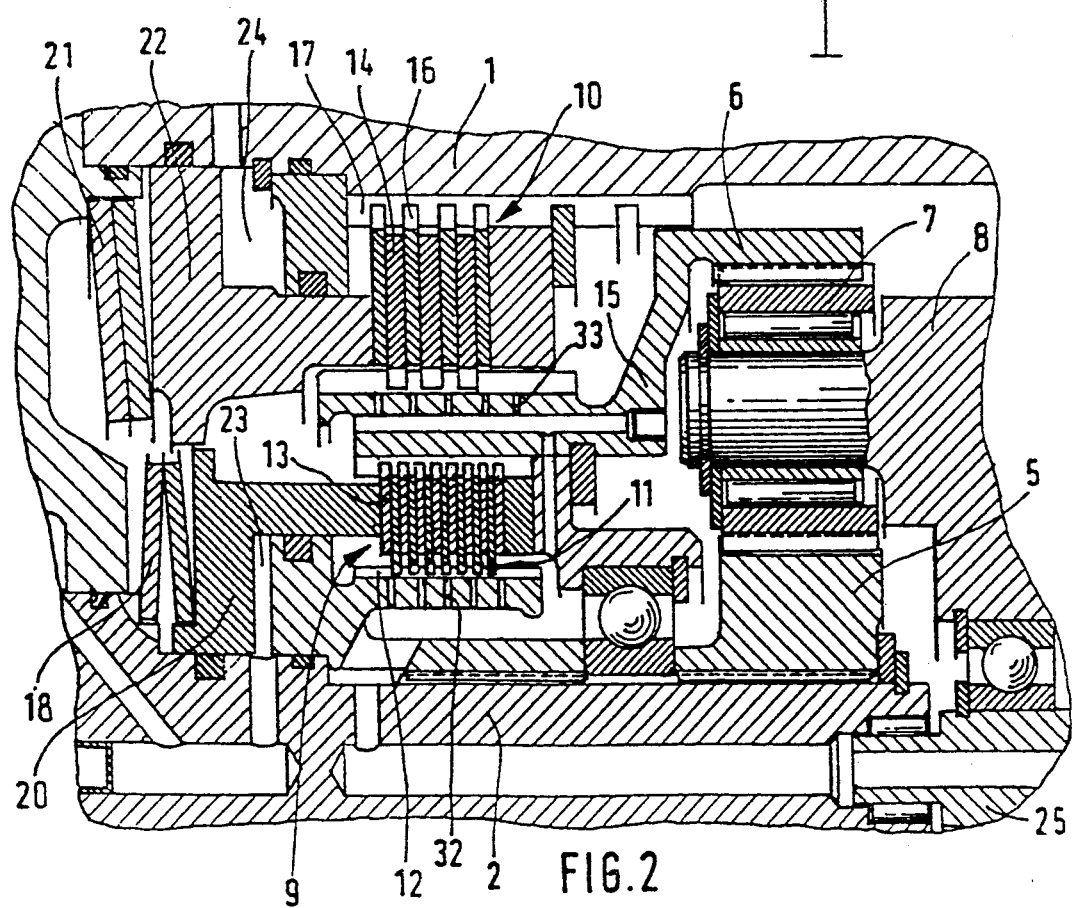
Figure 3:
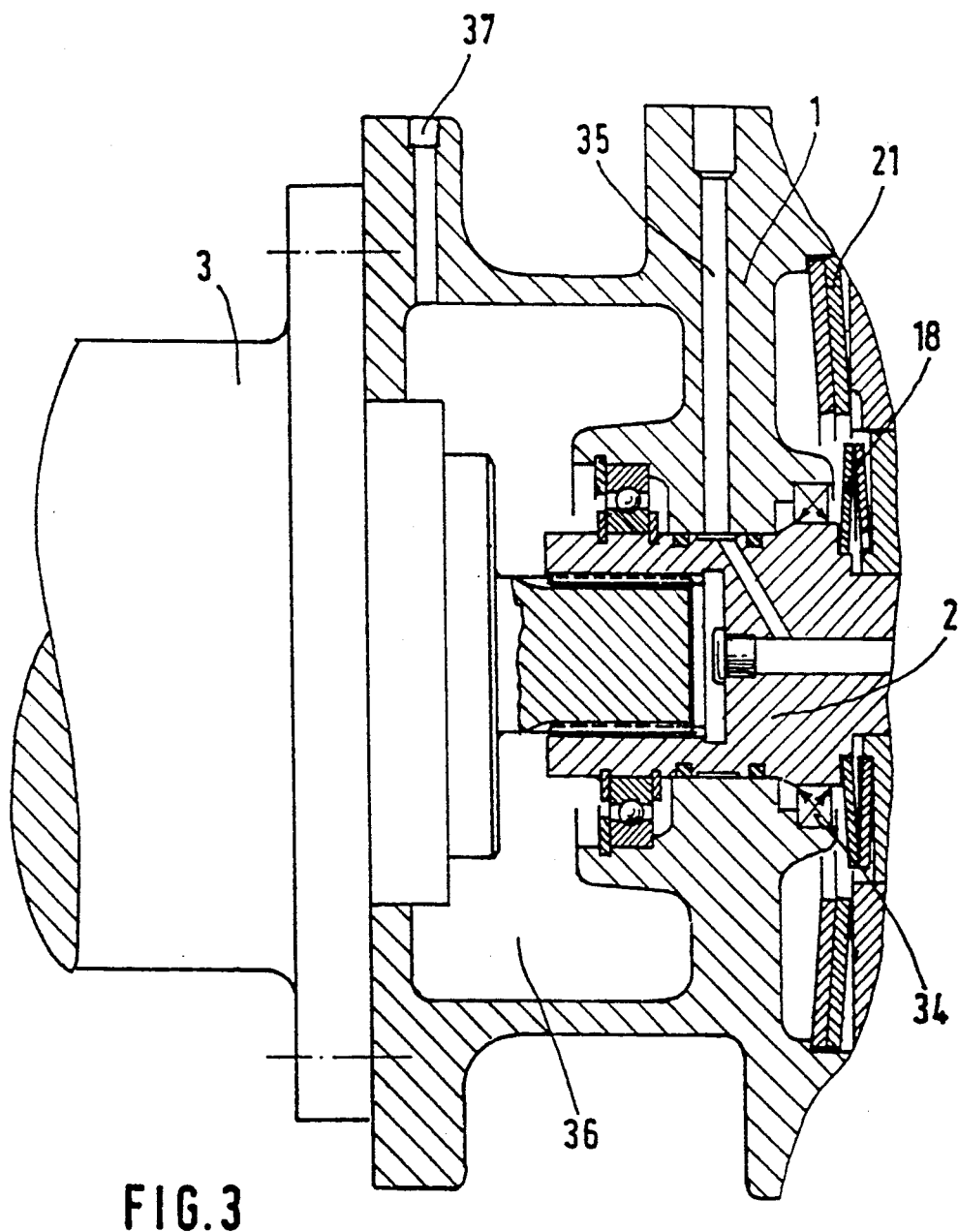

The invention is explained in detail herebelow with reference to an embodiment shown in the drawings. In the drawings:

FIG. 1 diagrammatically shows a cross-section through the driving mechanism according to the invention, FIG. 2 is a partial section of FIG. 1 in enlarged scale, and FIG. 3 is a partial section of FIG. 1 in enlarged scale when using the driving mechanism in a mobile excavator.

An input shaft 2, driven by a prime mover 3, is rotatably mounted in a housing and only diagrammatically shown. The prime mover 3 is designed with continuous speed and torque conversion starting from an initial zero speed. A hydromotor is especially adequate for this. But use of an electromotor is also possible. A two-speed gear transmission 4, situated in the housing 1, is designed as planetary gear. An internal central gear 5 of the planetary gear is fixedly connected with the input shaft 2. In addition, an external central gear 6 and a number of planetary gears 7 held on a planet carrier 8 belong to the two-speed gear transmission 4.

Both speed levels of the two-gear transmission 4 are engageable via two friction clutches 9 and 10. Both friction clutches 9 and 10 are radially telescoped with substantially equal axial reach. The radially external friction clutch 10 is designed as brake but hereinafter will be designated as friction clutch. Both friction clutches 9 and 10 are designed as multi-disc clutches. The radially internal and thus the smaller friction clutch 9 has internal discs 11 which are fixedly connected with the input shaft 2 via a disc carrier 12. External clutch discs 13 of the internal (first) friction clutch 9 and internal clutch discs 14 of the radially external and thus larger friction clutch 10 are fixedly connected with the external central gear 6 by a common disc carrier 15. External discs 16 of the external (second) friction clutch 10 are fixedly held on a disc carrier 17 which is firmly connected with the housing 1.

The internal friction clutch 9 is engaged by plate springs 18 via a piston 20. The external friction clutch 10 is engaged by plate springs 21 via a piston 22. The internal friction clutch 9 can be controlled by an oil pressure which is fed to a cylindrical space 23. The external friction clutch 10 can be controlled by oil pressure which is fed to a cylindrical space 24.

The planet carrier 8 is supported on a gear shaft 25 which in turn is supported in the housing 1. The gear shaft 25 carries a spur gear 26 which meshes with an additional spur gear 27. Both spur gears 26 and 27 together form a spur gear set 28. The spur gear 27 is secured to an output shaft 30 through which the wheels of the construction machine are driven.

A separating clutch 31 is installed between the two-gear transmission 4 and the spur gear set 28 through which the two-gear transmission 4 and the spur gear set 28 can be engaged and disengaged.

Herebelow is described the operation of the driving mechanism: When the vehicle is parked, both friction clutches 9 and 10, which are designed as spring accumulator clutches, are engaged by the force of the plate springs 18 and 21. Thereby the wheels of the two-gear transmission 4 are locked. The mechanism acts as parking brake.

To engage the first gear, the radially internal friction clutch 9 is disengaged by the fact that pressurized oil is fed to the cylindrical space 23. The piston 20 is thereby pushed to the left against the force of the plate springs 18. If the two-gear transmission 4 is, for instance, designed with a ratio of 1:4, then the radially external friction clutch 10 supports a locking torque which corresponds to triple the value of the input torque. On the planet carrier 8, which is connected via the engaged separating clutch 31 with the spur gear set 28 and thus with the output shaft 30, it is possible to receive an output torque having four times the magnitude of the input torque.

To engage the second gear, the internal friction clutch 9 is engaged while the external friction clutch 10 is simultaneously disengaged. After accomplishing the gear shift, the input torque divides into two branches: 75% of the input torque is conveyed to the planet carrier 8 via the engaged internal friction clutch 9, the disc carrier 15, the external central gear 6 and the planetary gears 7. In a second direct branch, 25% of the input torque from the input shaft 2 is conveyed to the planet carrier 8 via the internal central wheel 5 and the planetary gears 7. The planet carrier 8 then passes on the summed up power to the spur gear set 28 and the output shaft 30.

In the second gear, which corresponds to road speed, the external central gear 6 is braced with the internal central gear 5 via the internal friction clutch 9. If the vehicle should be braked in case of failure of the service brake, the cylindrical space 24, dosed via a brake valve not shown, is vented so that the external friction clutch 10 becomes continuously and permanently engaged. Due to the external arrangement of the friction clutch 10 and the large diameter of the internal and external discs 14 and 16 resulting thereby, the high braking energy occurring at high speeds of the vehicle can be satisfactorily absorbed. In case of a cross-country braking in first gear, braking takes place via the internal friction clutch 9. Here the speed of the vehicle amounts to only a fraction of the speed of the second gear so that the internal, smaller friction clutch 9 is in position to absorb substantially lesser braking energy.

In this manner, the driving mechanism works as auxiliary service brake. The full braking required by the legislator from maximum speed, that is, when the second gear is engaged, can be advantageously carried out with the arrangement of the friction clutches 9 and 10 according to the invention, since the large discs can absorb great friction and braking work and ensure a good dissipation of the great heat appearing on the housing 1.

If the vehicle has to be towed because of emergencies or relocation, then the separation clutch 31 is disengaged. Thus, the prime mover 3 and the two-gear transmission 4 are separated from the spur gear set 28. The drive from the wheel side of the vehicle takes place only up to the spur gear set 28. The planetary set of the two-gear transmission 4 and the friction clutches 9 and 10 are here stopped.

Aside from the above mentioned advantages, the driving mechanism of the invention offers the following added advantages: Both friction clutches 9 and 10 are so well lubricated, due to the bores 32, 33 situated in the disc carriers 12 and 15, that the auxiliary service brake formed by both friction clutches works with very little wear. When using the driving mechanism in a mobile excavator, it is not necessary to guide any separate brake line for the parking brake through the swivel joint. To move away from parking is also possible when using a relatively small oil pump and at low speeds, since only a very small amount of oil is needed to disengage one of the two friction clutches 9 or 10. A very small lift of about 0.2 mm suffices for releasing the discs of the friction clutches.

Taking into consideration questions of safety, the advantage that the vehicle cannot start without the separating clutch being engaged results with the construction of the driving mechanism according to the invention. This ensures that the auxiliary service and parking brake be fully capable of functioning.

When the driving mechanism is installed in a mobile excavator, it is also convenient and advantageous to place a shaft seal 34 between the input shaft 2 and the housing 1. Thereby leakage oil, which in a pressurized-oil connection 35 could escape to the cylindrical space 23 between the housing 1 and the input shaft 2, is limited to a housing space 36 provided to the left of the shaft seal 34 in FIG. 3. In the housing space 36 only circular cylindrical parts such as the input shaft 2 and connecting parts 2 of the prime mover 3 can revolve. Turbulence of the oil due, for instance, to toothed parts is not possible Leakage oil from the housing space 36 is automatically drained off into the oil tank placed in the upper chassis of the mobile excavator via a stand pipe 37. A separate suction pump can be eliminated by virtue of the arrangement of the housing space 36 that serves as collector space for leakage oil and is sealed in respect to the two-gear transmission 4.

| Reference Numerals | |
|---|---|
| 1 | housing |
| 2 | input shaft |
| 3 | prime mover |
| 4 | two-gear transmission |
| 5 | internal central wheel |
| 6 | external central wheel |
| 7 | planetary gear |
| 8 | planet carrier |
| 9 | friction clutch |
| 10 | friction clutch |
| 11 | internal disc |
| 12 | disc carrier |
| 13 | external clutch disc |
| 14 | internal clutch disc |
| 15 | disc carrier |
| 16 | external clutch disc |
| 17 | disc carrier |
| 18 | plate spring |
| 19 | — |
| 20 | pistons |
| 21 | plate spring |
| 22 | piston |
| 23 | cylindrical space |
| 24 | cylindrical space |
| 25 | gear shaft |
| 26 | spur gear |
| 27 | spur gear |
| 28 | spur gear set |
| 29 | — |
| 30 | output shaft |
| 31 | separating clutch |
| 32 | bore |

-continued

| Reference Numerals | |
|---|---|
| 33 | bore |
| 34 | shaft seal |
| 35 | pressurized-oil connection |
| 36 | housing space |
| 37 | stand pipe |

We claim:

1. A drive mechanism for a mobile excavation vehicle having a housing (1) containing a power shiftable two-speed transmission designed as a planetary transmission and driven by an input shaft from a prime mover (3) with continuous speed and torque conversion starting from an initial speed of zero, a sun gear (5) being fixedly connected with the input shaft of said two-speed transmission (4), the two speeds of said transmission being alternately engageable and disengageable via hydraulically shiftable first and second friction clutches (9, 10), at least one fluid pump being provided for supplying pressurized lubricating fluid, and both said friction clutches (9, 10) being spring clutches biased into engagement by a resilient member and disengageable by fluid pressure and both serving to shift gears of said two-speed transmission and as a parking and auxiliary service brake,
   wherein said second friction clutch (10) is situated for optional locking of an annulus gear (6) of said two-speed transmission (4) with respect to said housing (1),
   both said first and second friction clutches (9, 10) are radially telescoped and are actuatable independently of each other, and
   said first friction clutch (9) is a radially internal friction clutch situated for optional locking of said two-speed transmission and providing direct drive therethrough.

2. A drive mechanism for a mobile excavation vehicle having a housing (1) containing a power shiftable two-speed transmission designed as a planetary transmission and driven by an input shaft from a prime mover (3) with continuous speed and torque conversion starting from an initial speed of zero, a sun gear (5) being fixedly connected with the input shaft of said two-speed transmission (4), the two speeds of said transmission being alternately engageable and disengageable via hydraulically shiftable first and second friction clutches (9, 10), each of said first and second friction clutches (9, 10) having a plurality of discs, at least one fluid pump being provided for supplying pressurized lubrication fluid, and both said friction clutches (9, 10) being spring clutches biased into engagement by a resilient member and disengageable by fluid pressure and both serving to shift gears of said two-speed transmission and as a parking and auxiliary service brake,
   wherein said second friction clutch (10) is situated for optional locking of an annulus gear (6) of said two-speed transmission (4) with respect to said housing (1),
   both said first and second friction clutches (9, 10) are radially telescoped, are actuatable independently of each other, and have a portion of said plurality of discs carried by a common disc carrier,
   said first friction clutch (9) is a radially internal friction clutch situated for optional locking of said two-speed transmission and providing direct drive therethrough,
   said second friction clutch (10) is a radially external, larger friction clutch, and said second friction clutch (10) is engaged and said first friction clutch (9) is disengaged for engagement of a first gear and said first friction clutch (9) is engaged and said second friction clutch (10) is disengaged for engagement of a second gear, and
   said annulus gear (6) and said common disc carrier are formed as a single element.

3. A drive mechanism for a mobile excavation vehicle having a housing (1) containing a power shiftable two-speed transmission designed as a planetary transmission and driven by an input shaft from a prime mover (3) with continuous speed and torque conversion starting from an initial speed of zero, a sun gear (5) being fixedly connected with the input shaft of said two-speed transmission (4), the two speeds of said transmission being alternately engageable and disengageable via hydraulically shiftable first and second friction clutches (9, 10), each of said first and second friction clutches (9, 10) having a plurality of discs, at least one fluid pump being provided for supplying pressurized lubricating fluid, and both said friction clutches (9, 10) being spring clutches biased into engagement by a resilient member and disengageable by fluid pressure and both serving to shift gears of said two-speed transmission and as a parking and auxiliary service brake,
   wherein said second friction clutch (10) is situated for optional locking of an annulus gear (6) of said two-speed transmission (4) with respect to said housing (1),
   both said first and second friction clutches (9, 10) are radially telescoped, are actuatable independently of each other, and have a portion of said plurality of discs carried by a common disc carrier,
   said first friction clutch (9) is a radially internal friction clutch situated for optional locking of said two speed transmission and providing direct drive therethrough,
   when said parking and auxiliary service brake formed by said first and second friction clutches (9, 10) is actuated, one of said friction clutches (9 or 10) is disengaged during use of the parking and auxiliary service brake and is vented,
   said annulus gear (6) and said common disc carrier are formed as a single element, and
   an innermost disc carrier of said first friction clutch (9) is supported by said input shaft and is formed a single unitary element.

* * * * *